United States Patent Office

Re. 28,132
Reissued Aug. 27, 1974

28,132

CIRCUIT ARRANGEMENT INCLUDING A COLOUR DISPLAY CATHODE-RAY TUBE OF THE INDEX TYPE

Kenneth George Freeman, Reigate, and Michael Compton French, Great Bookham, England, assignors to U.S. Philips Corporation, New York, N.Y.

Original No. 3,562,409, dated Feb. 9, 1971, Ser. No. 736,712, June 13, 1968. Application for reissue Feb. 5, 1973, Ser. No. 329,550

Claims priority, application Great Britain, June 16, 1967, 27,918/67

Int. Cl. H04n *5/68, 9/16*

U.S. Cl. 178—5.4 F 10 Claims

Matter enclosed in heavy brackets [ ] appears in the original patent but forms no part of this reissue specification; matter printed in italics indicates the additions made by reissue.

ABSTRACT OF THE DISCLOSURE

A circuit for ensuring the minimum level flow of current in an indexing type color cathode ray display tube in order to prevent loss of the indexing signal during a scanning period. A gate is provided to prevent application of video signals to the display tube during the first few lines of each field, and during this time a control signal is produced from the indexing signal corresponding to the desired black level. The control signal thus produced is applied to the display tube for the remainder of the field.

This invention relates to circuit arrangements including a color display cathode ray tube of the index type. In particular it relates to such arrangements for automatically controlling the amplitude of a signal which would be derived from scanning the index strips of said tube in the absence of a video signal applied thereto.

A color display cathode ray tube of the index type normally comprises a series of vertical strips of phosphor on its screen. These phosphors are arranged to luminesce with different colors when excited by an electron beam and, in order that the correct phosphor should be excited at all times, it is necessary to have information as to the particular phosphor color which the beam is exciting at all times. In order to do this so called indexing strips are provided between groups of color strips. Thus a signal derived from scanning the indexing strips will provide information as to the beam position relative to the color strips. The indexing strips are usually arranged to emit ultraviolet radiation on being scanned by the electron beam, and this radiation is picked up by an ultraviolet radiation-sensitive element provided inside or outside of the tube.

In color television receivers employing such a tube the output of the element is processed to provide an RF carrier signal which is modulated with the color information obtained from the transmitted color television signal. After further processing the signal is applied to the control grid (or the cathode) of the cathode ray tube to provide the color drive.

Some indexing tubes employ a pattern of indexing strips whose repetition period is not the same as that of the color strips. For example, the color strips may be arranged in groups of three while the indexing strips may be provided after every two or four color strips. The result of scanning the screen of such a tube is the provision of an indexing signal whose frequency is only related to that of the groups of color strips and is not equal thereto. A receiver employing such a tube has to include inter alia a frequency divider for processing the index signal and this results in a possible phase ambiguity between the output signal of the frequency divider and the indexing signal obtained from the ultraviolet-sensitive element. This ambiguity can be overcome by modifying the structure of the indexing strips on the left-hand side of the cathode ray tube at a position corresponding in time with the start of each line scan of the tube. This modified index structure of so called "run in" strips provides two signals, one at the normal index frequency, and another at a lower frequency. These two signals enable the frequency divider to be started, at the beginning of each line scan, always in the same phase relative to the index signal.

Once the frequency divider has been started at the beginning of the line of scan it must not be allowed to stop subsequently during that line, since if it does so and then restarts its output signal during the remainder of the line may be in an incorrect phase relative to the index signal obtained from the element and this will result in incorrect colors being displayed.

In order to prevent the frequency divider stopping during the course of the line the cathode ray tube beam current must be prevented from falling below the minimum value at which the element provides sufficient output to enable the frequency divider to operate. To obtain a good "black" in the picture this minimum or "black level" current should normally be about 2½ /μa. Thus the video drive to the tube must be clipped to prevent it driving the cathode ray tube beam current below this value. The "black level" current may also be caused to fall below this value by variations in cathode ray tube heater or E.H.T. supply or grid-cathode voltage variations. As far as the signal seen by the frequency divider is concerned the same effect will occur if, for example, there is a decrease in the gain of an amplifier supplying it from the output of the ultraviolet sensitive element.

It is an object of the invention to provide a circuit arrangement by which the minimum value of the input applied to the frequency divider from the element may be maintained substantially constant.

The invention provides a circuit arrangement for automatically reducing fluctuations which would otherwise occur in the amplitude of a signal which would be derived from scanning the indexing strips of a color display cathode ray tube of the index type in the absence of a video signal applied to the tube, said arrangement comprising said tube, a video channel including a gate in series therewith and coupled to a control electrode of said tube, means for deriving a control signal from said tube during times when the gate is blocked, which control signal varies with said amplitude, means for coupling said control signal to said tube during each line scan to reduce fluctuations in said amplitude, and means for blocking said gate during field scan substantially starting times and rendering it conducting during the scan of the remainder of the lines of the fields on the tube screen.

Thus the circuit arrangement is made to cut off the video signal for a period at the start of several, for example each, field scan. This may be arranged to occur, for example for the first five lines of the scan of each field, or for lines three to ten of these scans, and during this time the tube current or the indexing signal derived from the tube can be sampled to obtain the control signal which is then used to maintain the effective "black level" constant.

The control signal can conveniently be derived from the output of the indexing amplifier (which normally would feed a frequency divider). This point is the closest one to the frequency divider input which can normally be used. In this case the field scan starting times must include times when at least a portion of a line lying on the tube screen at substantially the start of a field is scanned (overscanning being normally employed).

The means for deriving the control signal is conveniently only operative when the video channel gate is blocked and to this end it may include a second gate in series therewith, which second gate is arranged to conduct during said field scan starting times and to be blocked during said remainder of the lines of the fields.

An embodiment of the invention will now be described, by way of example, with reference to the accompanying diagrammatic drawings in which.

Figure 1:
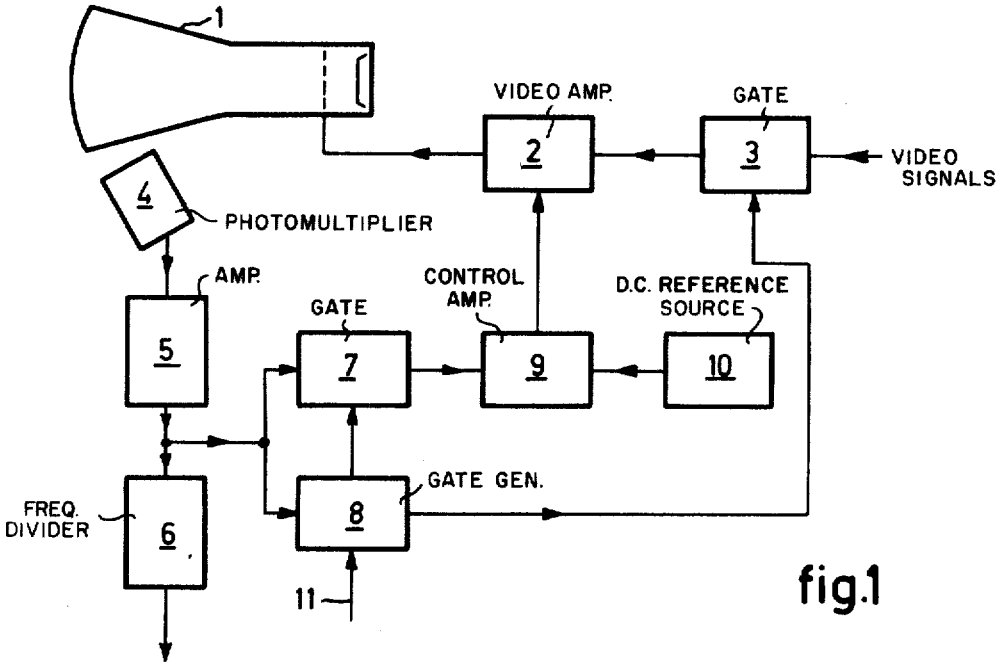
FIG. 1 shows a block diagram of the embodiment.

In FIG. 1 a color display cathode ray tube 1 of the index type has a video channel comprising a video amplifier 2 and a gate 3 coupled to a control grid thereof. The tube 1 is provided with ultraviolet-emitting indexing strips (not shown) and a photomultiplier 4 is positioned to pick up radiation from these indexing strips. The indexing signal supplied by the photomultiplier 4 is amplified in an amplifier 5 and coupled thence inter alia to a frequency divider 6 which supplied an output suitable for processing the video signal supplied to the tube in the normal way.

The index amplifier 5 also supplies a second gate 7 and a gating signal generator 8. The generator 8 supplies gating signals in a manner which will be described hereinafter to gate 3 and 7 so that the gate 3 is blocked during field flyback times and additionally during the first few lines of each subsequent field scan on the tube screen (field scan starting times) and the gate 7 is rendered conducting during these field scan starting times. Thus, the gate 7 feeds the index amplifier output to a control amplifier 9 during the field scan starting times (when the video channel gate 3 is blocked). The control amplifier 9 is arranged to derive a control signal from this index amplifier output and to apply it, via the video amplifier 2, to the control grid of the tube 1 to maintain the output of the amplifier 5 substantially constant during the field scan starting times. The amplifier 9 includes an integration circuit so that the control signal supplied therefrom to the tube 1 is maintained during the scanning of the subsequent lines of each field on the screen. The amplifier 9 is supplied with a DC reference voltage from a source 10 in order that the magnitude of the amplifier 5 output may be absolutely determined. The generator 8 is also supplied with the trailing edges of field flyback pulses by means of a lead 11.

In operation the video drive to the tube 1 is blocked by the gate 3 during each field flyback time and for the first few lines of the subsequent field scan on the tube screen. As soon as the subsequent field scan on the screen starts the gate 7 is rendered conducting and thus the control amplifier measures the magnitude of the indexing signal supplied from the photomultiplier 4 and the amplifier 5 and compares it with the DC reference from the source 10. The signal resulting from this comparison is integrated and applied as a DC control signal bias to the grid of the tube 1 in order to maintain the index amplifier 5 output substantially constant during these first few lines of the field scan. The resulting correction is maintained during the remainder of the field scan on the screen by means of the integrating action of the amplifier 9 and thus maintains the "black level" of the video signal subsequently supplied to the tube substantially constant and ensures that the output of the index amplifier 5 to the divider 6 never falls below a predetermined minimum value during each line scan.

Figure 2:
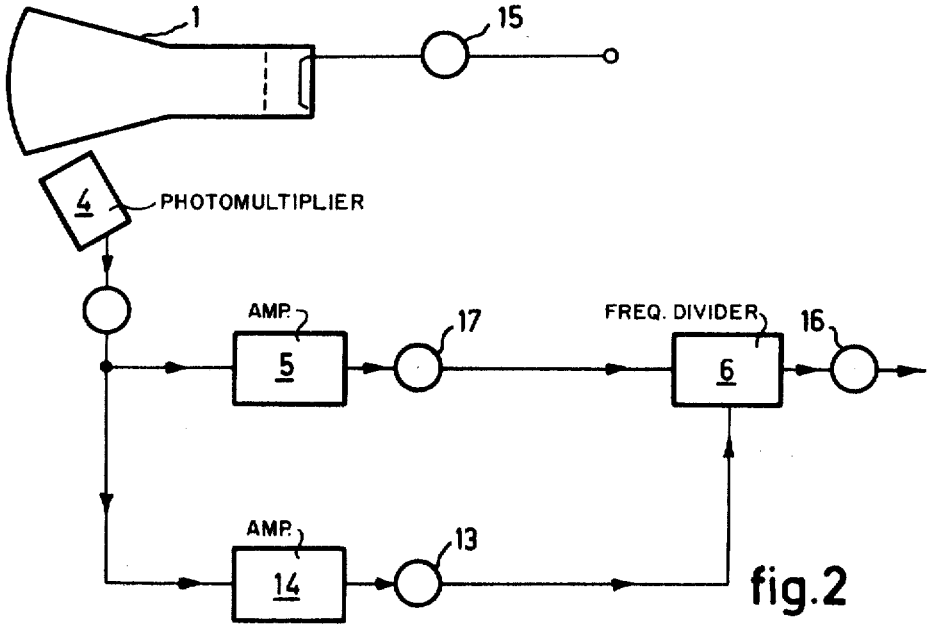
FIG. 2 shows some alternative points from which the control signal may be obtained.

FIG. 2 shows some additional circuitry normally provided around the tube 1 and alternative positions from which the input to the gate 7 may be derived. As a first alternative the point 12 at the immediate output of the photomultiplier 4 may be used, but in this case the resulting correction to the "black level" will not take into account any variations with time in the gain of the index amplifier 5. The same objection would apply if a point 13 were chosen at the output of a run-in amplifier 14, or if a point 15 were chosen from which a sample of the cathode ray tube cathode current could be obtained. A point 16 at the output of the frequency divider 6 could be used but the signal obtained at this point would not vary linearly with the output of the index amplifier 5 and thus additional complications would be caused. Thus the point 17 at the output of the amplifier 5 is preferred.

Figure 3:
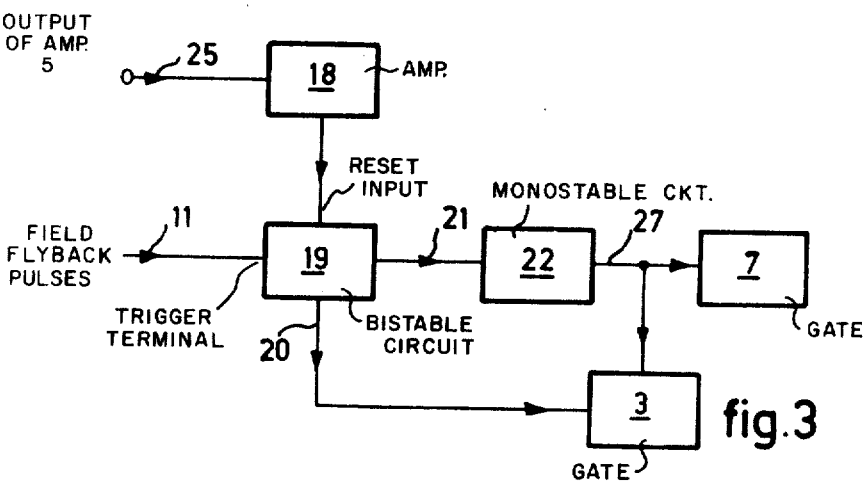
FIG. 3 shows a block diagram of the gating signal generator of FIG. 2.
Figure 4:
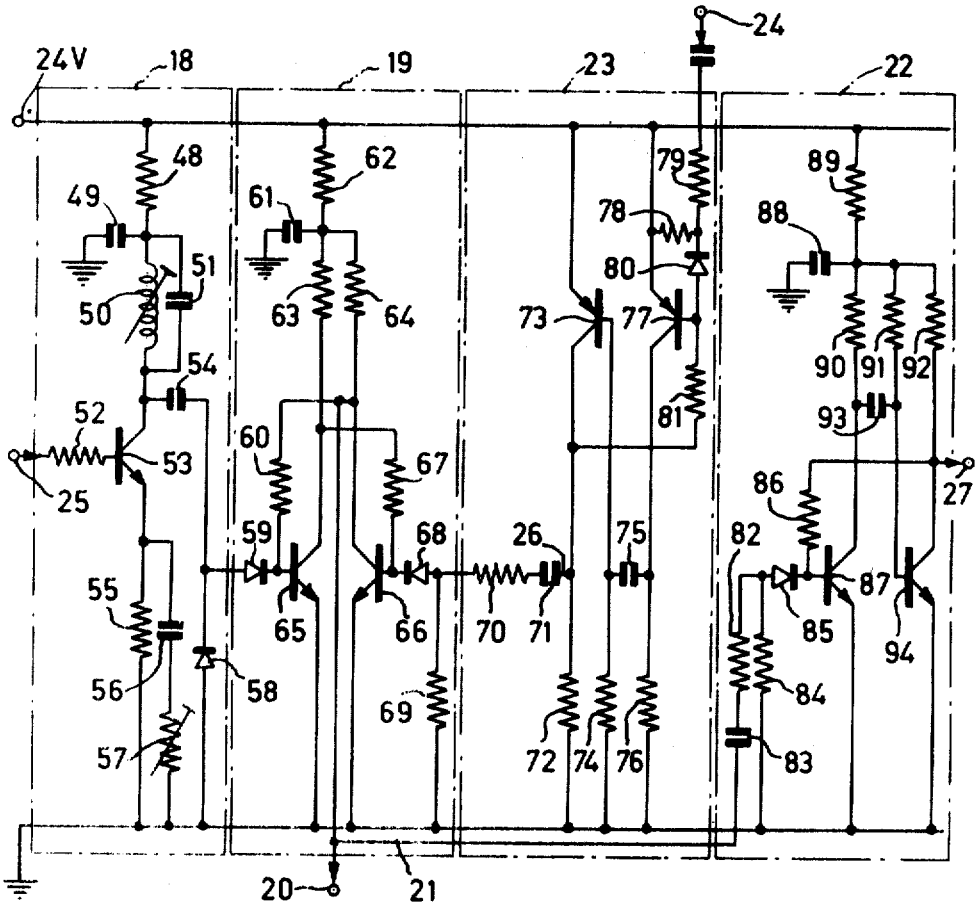
FIG. 4 shows a circuit diagram of the gating signal generator of FIG. 2.

FIGS. 3 and 4 show a possible embodiment of the gating signal generator 8 of FIG. 1. The index amplifier 5 feeds a reset terminal of a bistable circuit 19 via amplifier 18 which may be tuned. A trigger terminal of the circuit 19 is supplied with the trailing edges of field flyback pulses from the lead 11. An output 20 of the circuit 19 feeds the gate 3 and an output 21 is coupled to a trigger input terminal of a monostable circuit 22 having an "on" period equal to the time it is desired to open the gate 7 each time. The output of the circuit 22 is coupled to the gates 3 and 7 in order to block the gate 3 and to open the gate 7. The gate 3 is also blocked by the output 20.

FIG. 4 shows a possible circuit diagram of some of the blocks of FIG. 3. The semiconductors can be obtained under the type numbers given under the Registered Trade Mark "Mullard." The signal from the index amplifier 5 is fed to the arrangement of FIG. 4 by means of the lead 25. The circuit of FIG. 4 includes an extra monostable circuit 23 which may be used if the field time base does not supply a flyback pulse at the correct time for triggering the bistable circuit 19. If this is so the flyback pulse from the field oscillator may be fed to the monostable circuit 23 by means of the lead 24, the trigger pulse for the bistable circuit appearing at the lead 26. The output of the monostable circuit 22 is fed to the gates 3 and 7 by means of the lead 27.

Figure 5:
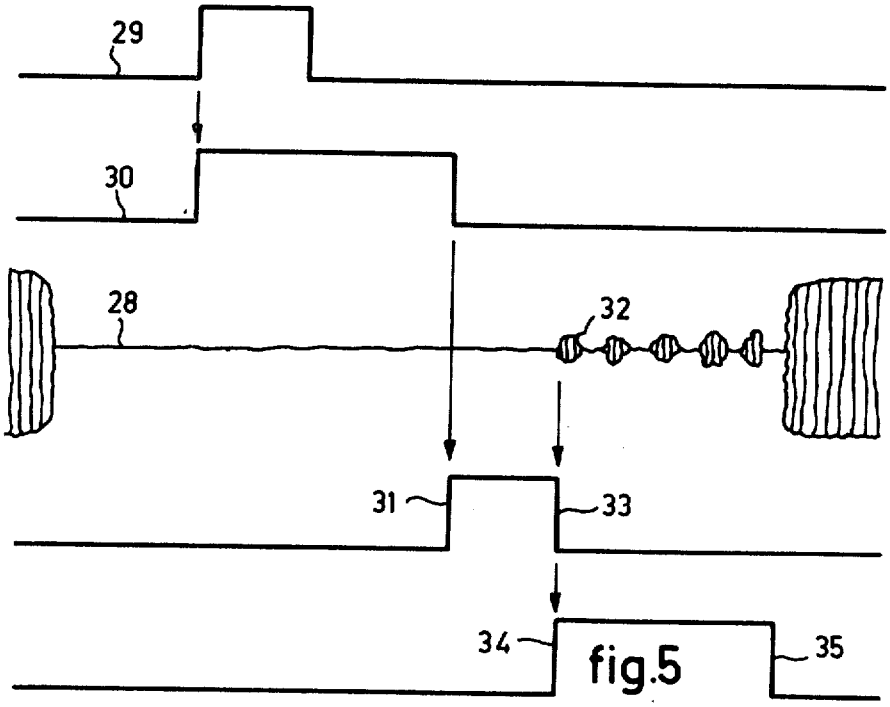
FIG. 5 shows possible input and output waveforms of the gating signal generator of FIG. 2.

Some possible waveforms appearing in the circuit arrangement of FIG. 4 in operation are shown in FIG. 5, together with the index signal (denoted by reference numeral 28) appearing in the index channel. Pulses appearing on the lead 24 from the field time base are denoted by 29 and the resulting output from the monostable circuit 23 is denoted by 30. The trailing edge of the output of the monostable 23 results in a pulse 31 appearing at the output 20 of the bistable circuit 19. This pulse is brought to an end by the appearance of indexing signals 32 at the lead 25. The trailing edge 33 thus generated gives rise to an output 34 on the lead 27 from the monostable circuit 22. This output is terminated at 35 after a time dependent upon the "on" time of this monostable circuit. Thus, the result is that the gate 3 is blocked at the end of the field flyback time by the pulse 31, 33 and then, during the time taken to scan on the tube screen the first few lines of the next field, by the pulse 34, 35. During this latter time the pulse 34, 35 also opens the gate 7. The pulses 34, 35 may also be used to remove the elevated run-in signal normally provided for in indexing circuits. The signal 30 may also be used for field flyback suppression.

Figure 6:
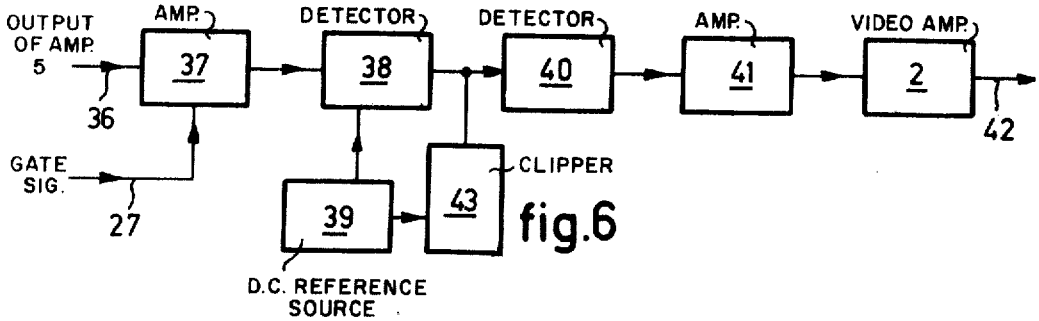
FIG. 6 shows a block diagram of the control amplifier of FIG. 2.
Figure 7:
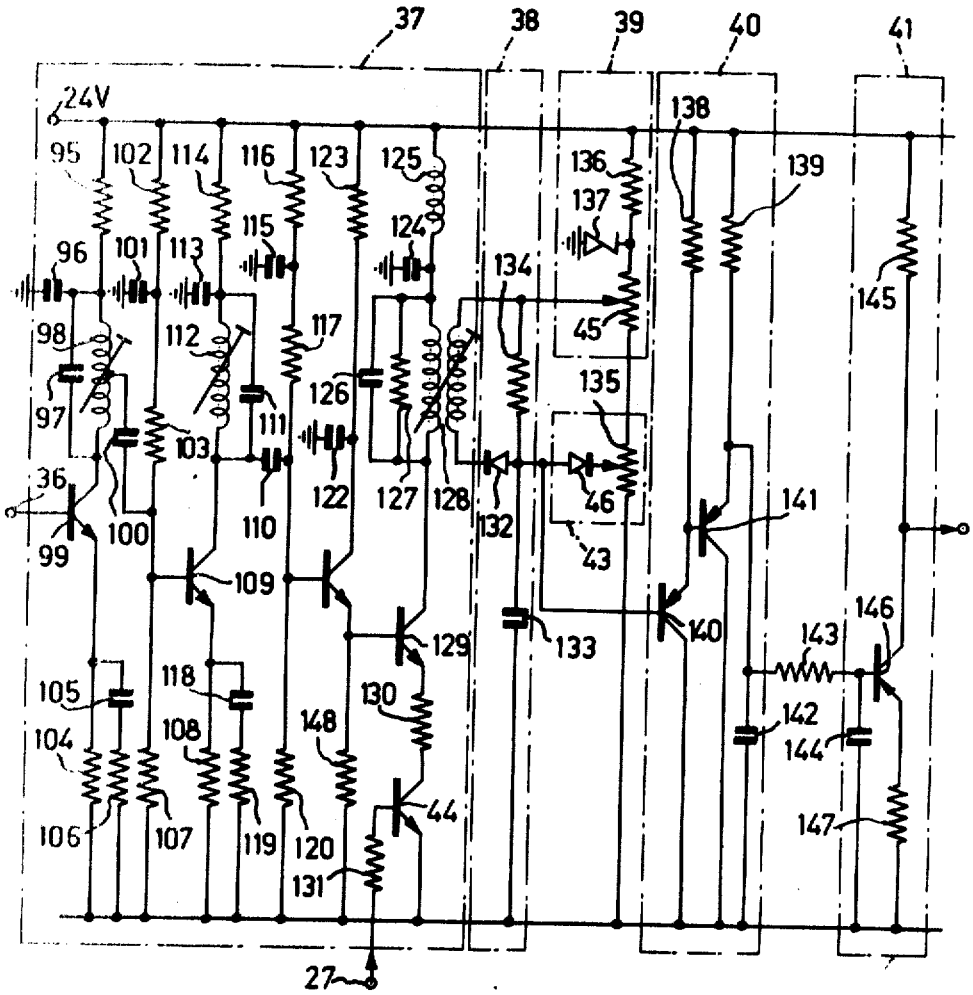
FIG. 7 shows a circuit diagram of the control amplifier of FIG. 2.

FIGS. 6 and 7 show in more detail how the control amplifier 9 and the source 10 may be constructed. The output of the index amplifier 5 is fed via a lead 36 to a further indexing amplifier 37 which incorporates the gate 7 and is supplied with the gating signal from lead 27 (FIGS. 3 and 4). The amplifier 37 in turn feeds a first peak detector 38 which incorporates a comparator for comparing its output with a variable DC reference voltage from a source 39. The detector 38 has an integration time long with respect to the line scan period. The comparator output is fed to a second peak detector 40 having an integration time long with respect to a field scan period. Thus the second detector 40 enables a substantially DC control voltage to be produced proportional to the peak amplitude of the signal supplied to the detector 40, and hence which varies with the signal supplied on the lead 36. This DC signal is amplified in a DC amplifier 41 and in the video amplifier 2 whose output is DC coupled to the control grid of the tube 1 by means of the lead 42.

In the absence of an index signal, e.g., when the circuit is first switched on, the control amplifier would attempt to establish a very high "black level." To limit this uncontrollable "black level" a diode clipping circuit 43 is connected to the output of the first peak detector. The diode is returned to a variable DC reference source (in this case a further source included in the box 39) so that excursions of the control signal supplied by the circuit of FIG. 6 in the direction representing a high "black level" are limited by the bias voltage applied to the diode.

The further index amplifier 37 may comprise three synchronously tuned stages with an emitter follower interposed between the second and third stages to reduce collector-base feedback effects in the last stage (FIG. 7). This circuit may be arranged to give a suitable overall bandwidth sufficient to ensure that its gain is substantially independent of variations in the index frequency. The gain of the amplifier is stabilized by employing emitter degeneration and driving each stage from a voltage source. The gating of the amplifier is accomplished by switching a transistor 44 in the emitter circuit to the final stage.

The output of the amplifier is transformer coupled into the first peak detector 38 so that the earthy side of the detector can be returned to a "set-black-level" control 45. The maximum positive excursion at the output of the detector is limited by a diode 46 connected between the output and a "set-uncontrolled-black-level" control 47. The integrating circuit formed by the 100 kΩ resistor and 390 pf. capacitor enables efficient detection of the line component of the input signal to the detector to be achieved without excessive damping of the output stage of the tuned amplifier. The second peak detector may consist of two emitter followers shown connected in cascade with an integrating circuit composed of a 100 kΩ resistor and 200 μμf. capacitor in the emitter circuit of the second stage. The coupling from the detector 40 to the amplifier 41 includes an RF filter formed by the 2 K 2Ω resistor and 4 K 7 pf. capacitor in order to ensure that all RF signals may be suppressed at the input to the amplifier 41.

With the circuit of FIG. 7 the overall gain may be about 100. The gain of the video amplifier 2 (not shown in the diagram of FIG. 7) may be about 10 so that the overall gain in the control loop may be about 1,000. This has been found sufficient in one receiver to control the index signal amplitude at "black level" to within ±25 percent of its nominal level under all normal operating conditions.

Although the arrangement has been described in isolation it will be evident that it will normally be incorporated in a color television receiver of the index type.

We claim:

1. A circuit arrangement for automatically reducing fluctuations which would otherwise occur in the amplitude of a signal which would be derived from scanning [the indexing strips of] a color display cathode ray tube [of the index type] in the absence of a video signal applied to the tube, said arrangement comprising [said tube,] a video channel coupled to a control electrode of said tube, characterized in that the circuit arrangement comprises a gate in series with the video channel and means for deriving a control signal from said tube during at least a part of the times when the gate is blocked, which control signal varies with said amplitude, means for coupling said control signal to said tube during each line scan to reduce fluctuations in said amplitude, and means for blocking said gate during field scan starting times and rendering it conducting during the scan of the remainder of the lines of the fields on the tube screen.

2. An arrangement as claimed in claim 1 wherein said field scan starting times are the periods at the start of each field scan when the first few lines are scanned.

3. An arrangement as claimed in claim 1 *wherein said tube comprises an index tube and* wherein the field scan starting times include times when at least a portion of a line lying on the tube screen at substantially the start of a field is scanned, the arrangement including means for deriving an indexing signal in response to the scanning of the indexing strips by the tube electron beam, an amplifier for amplifying said indexing signal and a frequency divider, the inputs of said means for deriving a control signal and of said frequency divider being coupled with the output of said amplifier.

4. An arrangement as claimed in claim 1 wherein [the control signal is arranged to be coupled to the tube via] *said coupling means comprises* a part of the video channel subsequent to the video channel gate.

5. An arrangement as claimed in claim 1 wherein the means for deriving the control signal includes a second gate in series [therewith] *with the remainder of said deriving means,* which second gate [is arranged to conduct] *conducts* during said field scan starting times and *is* [to be] blocked during said remainder of the lines of the fields.

6. An arrangement as claimed in claim 5 *wherein said tube comprises an index and* including means for deriving an output in response to the scanning of the indexing strips by the tube electron beam and with its output coupled to a reset terminal of a bistable circuit, means for coupling the trailing edge of the field flyback pulses to a trigger terminal of said bistable circuit, an output of said bistable circuit [being arranged to block] *blocking* the video channel gate, and an output of the bistable circuit being coupled to a trigger input terminal of a monostable circuit having an "on" period equal to the time it is desired to open the second gate each time, the output of the monostable circuit [being arranged to block] *blocking* the video channel gate and to open the second gate.

7. An arrangement as claimed in claim 3 wherein the means for deriving a control signal comprises a peak-detector *coupled to said index signal amplifier,* a DC reference voltage source *coupled to said peak detector,* and a comparator *means coupled to said peak detector* for comparing the peak-detector output with [the] *a* DC reference, [the resultant circuit] *said* coupling *means* [the peak-detector output with the tube] *comprising an integration means* having an integration time long compared with a field scan period.

8. An arrangement as claimed in claim 7 wherein the peak-detector has an integration time long compared with a line scan period, the comparator output being coupled to said tube via a second peak detector having an integration time long compared with a field scan period.

9. In a color television receiver of the type having [an indexing type] *a* color display tube, a source of video signals, means applying said signals to said tube, means for deriving [indexing signals] *a first control signal* from said tube, and a source of field flyback pulses; the improvement comprising means connected to said source of flyback pulses and said means for producing said [indexing] *first control* signal for producing a *second* control signal responsive to the level of said [indexing signals] *first control signal* during only predetermined lines of each field, said means for applying said video signals to said tube comprising gate means *having an input means for receiving said signals and an output means coupled to said tube,* means for blocking said gate means during said predetermined lines, and means for maintaining current in said tube at a predetermined minimum level comprising means for applying said *second* control signal to said tube during the remainder of the lines of each field.

*10. A receiver as claimed in claim 9 wherein said tube comprises an index tube and wherein said first control signal comprises an indexing signal.*

References Cited

The following references, cited by the Examiner, are of record in the patented file of this patent or the original patent.

UNITED STATES PATENTS

| | | | |
|---|---|---|---|
| 2,259,538 | 10/1941 | Wheeler | 178—7.50 DC |
| 2,967,210 | 1/1961 | Kell | 178—5.4 F |
| 3,201,510 | 8/1965 | Davidse | 178—5.4 F |
| 3,234,324 | 2/1966 | Mutschler | 178—5.4 |
| 3,305,628 | 2/1967 | Kitamura | 178—5.4 F |

RICHARD MURRAY, Primary Examiner

G. G. STELLAR, Assistant Examiner

U.S. Cl. X.R.

178—7.5 R